(No Model.)
R. COOPER, H. F. CLAYTON & G. H. HOLDROYD.
FILTERING APPARATUS.
No. 401,930. Patented Apr. 23, 1889.
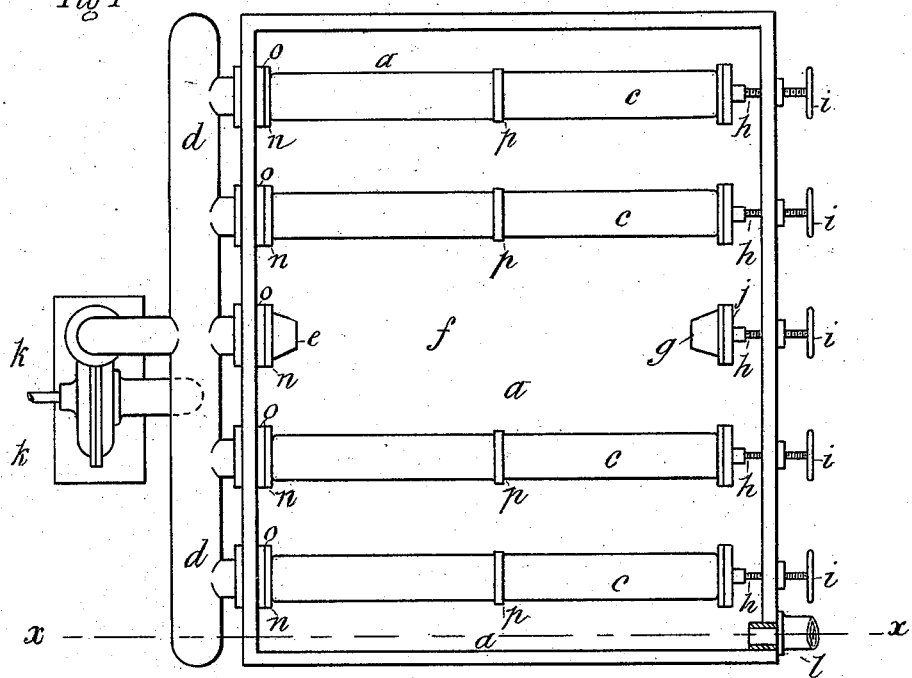
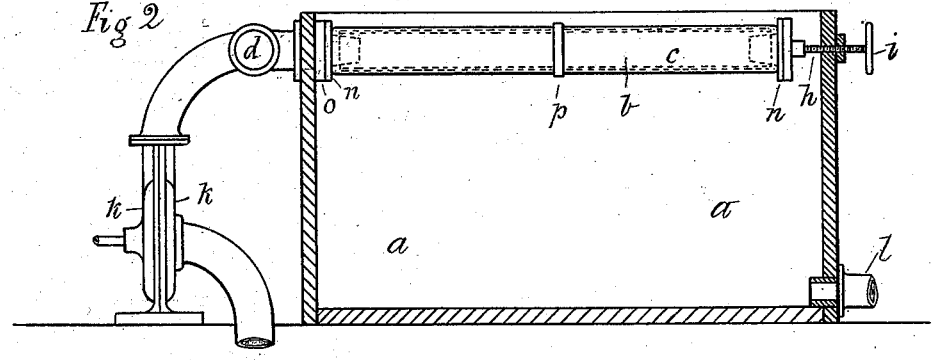
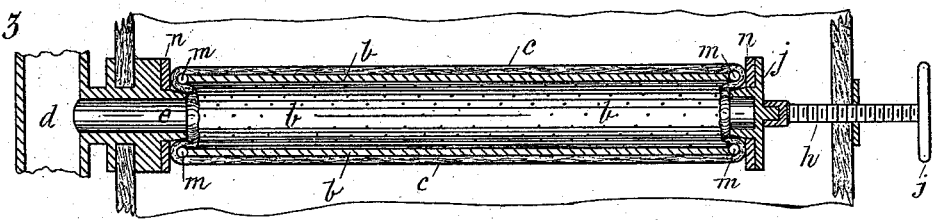
Witnesses.
Inventors.
Robt. Cooper,
H. F. Clayton
and G. H. Holdroyd
by John J. Halsted & Son, their Attys.

UNITED STATES PATENT OFFICE.

ROBERT COOPER, HERBERT FITZROY CLAYTON, AND GEORGE HOLDEN HOLDROYD, OF HUDDERSFIELD, ENGLAND.

FILTERING APPARATUS.

SPECIFICATION forming part of Letters Patent No. 401,930, dated April 23, 1889.

Application filed July 5, 1888. Serial No. 279,144. (No model.) Patented in England April 18, 1888, No. 5,806.

*To all whom it may concern:*

Be it known that we, ROBERT COOPER, HERBERT FITZROY CLAYTON, and GEORGE HOLDEN HOLDROYD, subjects of the Queen of Great Britain, residing at Huddersfield, England, have invented new and useful Improvements in Filtering Apparatus, (for which we have obtained a patent in Great Britain, dated April 18, 1888, No. 5,806,) of which the following is a specification.

Our invention relates to filtering apparatus of that class in which perforated surfaces covered or clothed with cloth or other filtering media are employed.

The chief objects of our said invention are to provide apparatus of this class which occupies very little space, which is rapid in its action, and in which the filtering medium can be easily removed for cleansing or renewal, and to these ends it comprises the improvements hereinafter described.

In the accompanying drawings, Figure 1 is a plan of apparatus constructed according to our invention. Fig. 2 is a vertical section of the same on the line $x\,x$, and Fig. 3 is a sectional view of a detail drawn to an enlarged scale.

$a$ is a tank, which, as shown, is of rectangular shape, but which may be of any other desirable shape, and $b\,b$ are a series of perforated tubes, which are covered with filtering-cloth $c$, wrapped around the said tubes, and which are arranged over the said tank, as hereinafter described.

$d$ is the tube through which the liquid to be filtered is introduced into the filtering-tubes, the said tube being provided with a series of nozzles, $e\,e$, which project through the wall of the tank, as shown more clearly at $f$, where one of the filtering-tubes is removed. These nozzles are preferably made tapering, as shown in Fig. 3, for a purpose hereinafter mentioned.

$g\,g$ are plugs which are carried by screws $h$ $h$ and provided with hand-wheels $i\,i$, the said plugs being arranged to correspond with the nozzles $e\,e$ in the opposite wall of the tank. These plugs have flanges $j\,j$, and are preferably tapered in the same manner as the nozzles $e\,e$.

$k$ is a centrifugal pump, which is adapted to force the liquid into the filtering-tubes; but any other form of pump may be used, and in cases where the liquid has a head the pump may be dispensed with.

$l$ is a discharge-pipe at the bottom of the tank.

$m\,m$ are beads which are formed on the ends of each tube $b$, and $n\,n$ are packing-rings which are placed between the flanges $j\,j$ and the tubes at one end and between the wall of the tank or collars $o\,o$ on the nozzles $e\,e$ at the other end. These rings not only insure the formation of tight joints at the end of the tubes, but, in conjunction with the beads $m\,m$, prevent the filtering-cloth from being cut. If, now, liquid is forced through the perforated tubes and the filtering medium, it will be cleansed. If it is desired to pass the liquid through the filter more than once, the pipe $l$ is connected with the pump. While this repeated filtering is taking place the supply of unfiltered liquid is stopped.

In some cases it may be advisable to place clamping-rings $p\,p$ around the filtering medium to prevent the same from bulging outward under the pressure within the tubes.

The operation of our apparatus is as follows—that is to say, one or more layers of cloth or other suitable filtering material is or are wound or wrapped around each tube $b$ until the filtering medium is of the required thickness, the cloth being of such width and so wound that it projects a few inches at each end of the tube, the said projecting ends being turned within the tube, as shown in Fig. 3. Each tube is now placed at one end upon a nozzle, $e$, and the opposite plug, $g$, is forced into the other end, the tapering surfaces of the nozzle and plug, in conjunction with the elastic packing-rings $n\,n$, serving to compress the cloth tightly against the beaded ends of the tube to prevent leakage.

Having now particularly described and ascertained the nature of our said invention and in what manner the same is to be performed, we declare that what we claim is—

1. In a filtering apparatus, one or more perforated tubes, each tube having an exterior covering composed of a filtering medium turned inward over the ends, combined with a tapering nozzle adapted to enter and support one end of the tube, and a tapering plug adapted to enter and support its other end, as and for the purposes described.

2. The combination, in a filtering apparatus, of perforated tubes having rounded or beaded ends, a filtering-cloth wrapped externally on such tubes and having its ends turned inward over such beaded ends and projecting into the tubes, and nozzles and plugs severally projecting into opposite ends of the tubes and holding the tubes to place, all substantially as and for the purposes set forth.

3. In a filtering apparatus, perforated tubes covered externally with filtering-cloth turned at its ends inside said tubes, combined with and supported by tapering plugs and nozzles inserted in the tube end, and elastic packing-rings placed between the ends of the tubes and the said plugs or nozzles to form tight joints and to prevent the cutting of the filtering material, substantially in the manner described.

ROBERT COOPER.
     HERBERT FITZROY CLAYTON.
     GEORGE HOLDEN HOLDROYD.

Witnesses:
 W. J. BAKER,
 PERCY BAKER.